Figure 1:
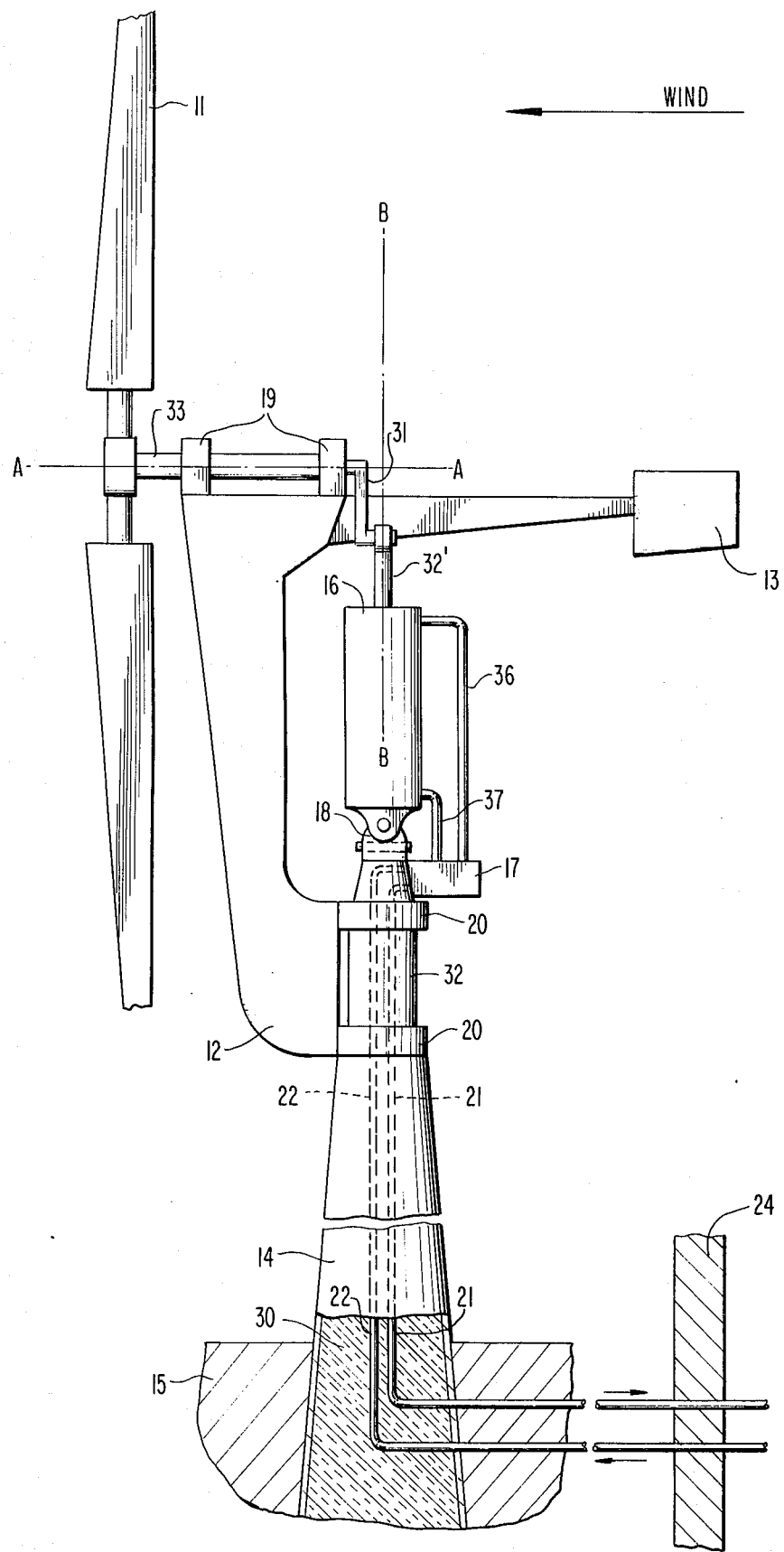

United States Patent

Browning

[11] 3,952,723

[45] Apr. 27, 1976

[54] WINDMILLS

[75] Inventor: James A. Browning, Hanover, N.H.

[73] Assignee: Browning Engineering Corporation, Hanover, N.H.

[22] Filed: Feb. 14, 1975

[21] Appl. No.: 549,924

[52] U.S. Cl. .................. 126/247; 122/26; 60/641; 237/1 R; 290/54; 417/334
[51] Int. Cl.² .................. F24C 9/00; F22B 9/06; F03D 9/00
[58] Field of Search .................. 126/247; 237/1; 417/334, 20, 26, 35; 290/42–44, 54; 122/26; 60/641

[56] References Cited
UNITED STATES PATENTS

| | | | |
|---|---|---|---|
| 1,675,159 | 6/1928 | Burch | 417/334 X |
| 3,752,395 | 8/1973 | Ashikian | 60/641 X |

Primary Examiner—William E. Wayner
Attorney, Agent, or Firm—Whitcomb Clark & Moeser

[57] ABSTRACT

A system for deriving useful energy from a windmill in which a liquid pump is driven by the windmill. Useful energy is obtained by either a fluid driven generator or a friction heater. The output of the pump and the speed of the windmill are controlled by a constant volume valve in the fluid circuit.

5 Claims, 3 Drawing Figures

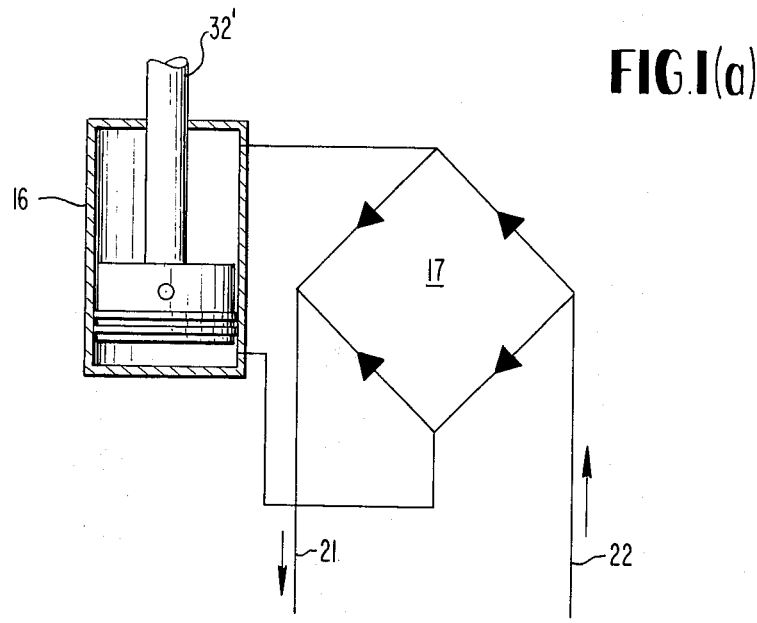
FIG.1(a)
FIG.2
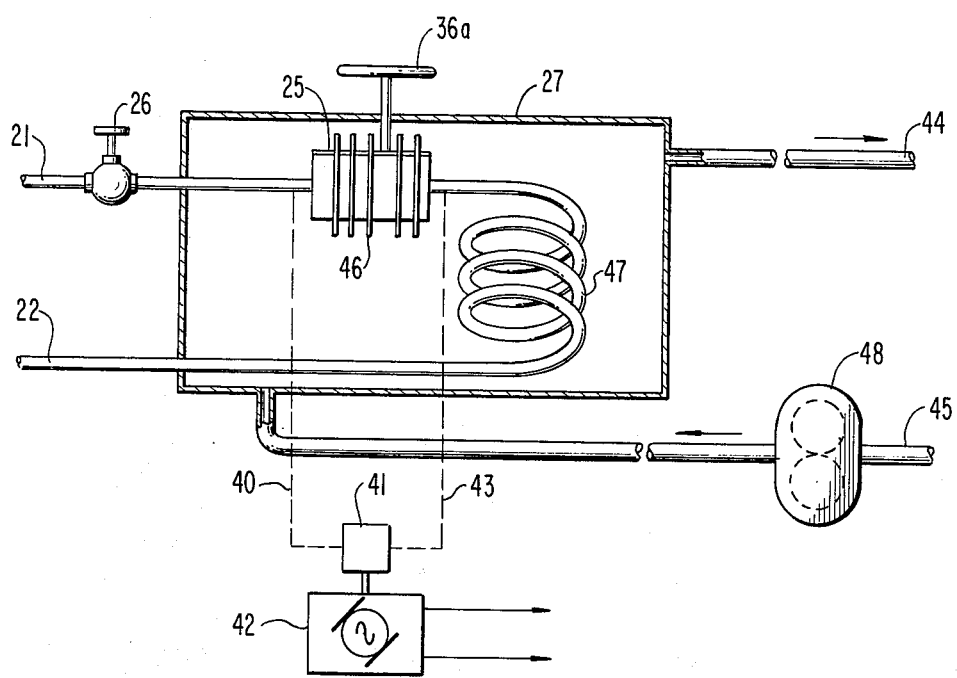

WINDMILLS

My invention relates to the extraction of energy from the wind, and relates more particularly to an improved windmill in which the mechanical energy is economically stored in usable form.

Windmills, of course, have been in use for centuries, and the power derived has in the past been directly harnessed in mechanical form to pump water, and perform an endless variety of other tasks. In more recent times the power of the wind has been transformed into electrical energy by driving a generator or alternator with a windmill. Since the basic energy source is by nature intermittent the electrical energy must be stored in batteries in the form of chemical energy. Power thus stored can be drawn at will from the energy bank represented by charged batteries.

This mechanical-electrical method of utilizing wind power has been the one to which attention of investigators in the field has been directed. While it is sophisticated, there are a number of obvious drawbacks. First, the equipment required for the various transformations is expensive to acquire and requires considerable maintenance. Then too, electrical energy is notoriously difficult and expensive to store. Batteries are slow to charge, and are limited in capacity. And yet this method to date has been the only practial one. For these reasons wind power has seen only limited application in our modern economy. Costs per unit of energy, however expressed, are still too high in spite of the rising costs of fossil fuels and other alternatives.

While energy in electrical form is most versatile, I propose to by-pass all the foregoing difficulties and limit myself primarily to the production of heat. The need for heat is a major call on our energy sources. It does not seem practical to convert most wind power to such a sophisticated form of energy as electricity, when a large share of our energy needs can be stated directly in terms of heat units.

By taking this approach I find that a very simple, inexpensive system can be devised in which wind power is used to best advantage. It can be economically stored and used to meet a large share of our energy needs. At the same time, some auxiliary electrical power may also be developed as will hereinafter be explained.

My invention is best understood from the following description and drawings, in which FIG. 1 is a view in elevation of a windmill with associated equipment;

FIG. 1 (a) is a schematic diagram of an oil circuit used with the invention; and FIG. 2 is a schematic view of the part of the system in which the energy is extracted and stored.

Referring now more particularly to FIG. 1, I show a windmill with blades 11 attached to shaft 33 which is free to rotate in a pair of bearings 19 fixed to a frame 12 and defining axis A—A. Other major elements of the basic structure include the frame 12 which is free to rotate about an axis B—B on a second pair of bearings 20 also affixed to said frame. A columnar shaft 32 supports the bearings 20 upon which the frame 12 (together with the windmill itself) is free to rotate. The columnar shaft 32 is fixed to a vertical tower 14 of appropriate height. The tower is securely mounted on a foundation as shown at 15.

The rotary motion of the blades 11 is converted to reciprocating motion by a crank 31 which is attached both to the shaft 33 and to the piston rod 32' of an hydraulic cylinder 16. The cylinder 16 is mounted through a universal joint 18 to the top of the columnar shaft 32. It will now be apparent that whatever the direction of the wind, the device can take any angular position, while the rotating blades activate the piston rod 32'. I show the wind direction to illustrate the attitude of the blades with respect to that direction. A counterweight 13 is used to keep the device in balance. It will be appreciated that the cylinder 16 itself does not turn, but the piston inside, of course, can, thus producing free positioning (in accordance with the wind) without the need of slip rings or other complexities which make for unreliability.

As shaft 33 turns the piston in the double-acting hydraulic cylinder 16 moves up and down to pump hydraulic fluid alternately into and out of hoses 36 and 37. I use a closed system, filled with an essentially incompressible liquid (such as oil) which remains liquid at operating temperatures likely to be encountered.

The oscillating oil flow from the cylinder 16 may be compared to the oscillating current from an electrical alternator. I pass the flowing oil into a fluid rectifier 17. The oil flows, thus rectified, through a line 21 down the tower 14 and through the wall 24 into the structure shown in FIG. 2. The oil flowing back returns through a line 22, up the tower 14 and back to the rectifier 17. The rectifier 17 consists of four simple check valves arranged in bridge form. The schematic diagram of FIG. 1(a) makes this clear.

Turning now to FIG. 2, I provide an hydraulic flow control valve 25 with an adjustment of volumetric flow by a control knob 36(a). It is at this valve 25 that work is done in the system. The valve 25 presents an orifice across which essentially all of the hydraulic pressure drop occurs. It is therefore here that the work done by the windmill appears in the form of heat. The rest of the closed system —cylinder, lines, and rectifier—are of low impedance with only negligible amounts of heat being generated at their respective positions.

It is well here to point out that the valve 25, as is well understood in the art of hydraulic control devices, passes a given volume of oil, per unit of time, by sensing the pressure drop across its main orifice and maintaining such drop constant by continually and automatically varying the size of a control orifice inversely with the changes in the outside pressure applied. Such valves were first disclosed in U.S. Pat. No. 739,866, dated Sept. 29, 1903 issued to James Hartness. See FIG. 51 therein and page 12, column 2 for discussion thereof. Such devices are now mass produced, effective, trouble free, and inexpensive. They are conventionally used primarily to control flow, but in this context they are used as an impedance to absorb the work done and produce heat. The flow control feature is combined to govern the speed of the windmill as explained above.

Thus as the wind velocity increases there is no increase in the oil flow rate, and (since the oil is essentially incompressible) no increase in angular velocity of the blades 11. Rather the total oil pressure will rise to accept the extra work being done by the blades, and more heat will appear in the valve 25. I can therefore set, by means of the control knob 36(a) the maximum allowable speed of the windmill to prevent undue centrifugal stresses.

This is an effective safety feature of my system. Increased torque from the blades simply produces more power at the same angular velocity. For example, if the blades are designed for an optimum wind velocity of 25 mph, the oil pressure at the level can be set at, say, 300 psi. Increases in wind velocity will raise such pressure, and consequently the amount of power delivered. Hydraulic components which would be used here are routinely manufactured for up to 5000 psi, and thus a large factor of safety is inherent in the design. If desired, the windmill can be shut down completely simply by closing a valve 26. This can be done automatically in response to sensing devices responding to oil temperature, wind velocity or other parameters.

In the conventional windmill, where increases in wind velocity increase the angular velocity of the blades, the blades are able to match the air-to-blade entry angle over a wide range. This is a disadvantage at high wind velocities as the blades must absorb undue amounts of power at such times. For this reason, conventional windmills must be provided with brakes or blade feathering devices to prevent failure. In my invention, the top speed is established. High wind velocities merely cause the air to strike the blades at non-optimum angles. Therefore control is provided with no complicated devices necessary atop the windmill.

Inside the structure to be heated (see FIG. 2) I immerse the valve 25 in a heat exchanger 27 connected by lines 44 and 45 to a large reservoir of water (not shown) which acts as a heat sink to store the energy thus produced. To enhance the efficiency of the system the body of valve 25 may be provided with heat radiating fins 46. Also the return line to the windmill may be arranged in a coil as at 47. I insulate the lines in the tower 14 as at 30 to minimize losses outside the heat exchanger.

A pump 48 is provided to circulate water between the heat exchanger and the reservoir. This pump consumes relatively small amounts of electricity from the available conventional electrical system. It may be made responsive to differentials between water temperature in the heat exchanger and water temperature in the reservoir, so as to automatically circulate water whenever the former exceeds the latter. Heated water in the reservoir may then be circulated to radiating members located in the structure to be heated whenever desired.

Storage in a large mass of water, for example 3000 gallons, provides carry over during periods of low or zero wind velocity. Alternatively, the heated oil can go directly to radiators, saving the cost of heat storage. In the latter case, of course, an auxiliary conventional heat source would be necessary to supplement the energy thus intermittently derived from the windmill.

To provide an adequate amount of heat for the average application a windmill must be quite large. In a practical embodiment, where it is necessary to develop the heat equivalent of one gallon of oil burned per hour in a conventional furnace, and designing for a wind velocity of 20 mph, the diameter of a circle containing the blade tips is nearly 50 feet. However the hydraulic components are small, the cylinder being about 4 inches in diameter with a 12 inches piston stroke. RPM at that point would be approximately 70.

Even though the blades are large (root width 3 feet; tip width 1.5 feet for example) they can be inexpensively made as centrifugal stresses are kept low. The primary concerns in blade design are optimum shape and ability to withstand bending stresses.

While I have used my invention primarily as a producer of heat (and that is its best use) it is also possible with the hydraulic system described to tap off mechanical energy and thereby produce and store some electricity.

To this end, an hydraulic motor 41 can be connected by means of lines 40 and 43 across the valve 25 where the pressure drop in the system occurs. The motor drives a generator 42 the output of which may be used to provide power directly to a load or to a bank of batteries. Note that the generator, motor, and associated equipment are conveniently inside the structure, and need not be exposed on the windmill tower as is the case in conventional systems. Furthermore, after a minimum wind velocity occurs the hydraulic motor runs at a constant speed, as it is connected across the constant pressure orifice of the valve 25.

In summary, I have described a windmill system capable of producing large amounts of energy—heat, electricity, or combinations of both. By the use of hydraulic components simplicities in design are achieved, and a system results which is rugged and trouble free. Maintenance is at a minimum, and the components on the tower exposed to the weather are well adopted to function in such locations. The mechanical connection between the wind driven rotor and the energy translating devices is simple and permits free orientation of the windmill blades with respect to wind direction. No complex governing devices are required. The hydraulic components are for the most part standard, well developed items mass produced for general industrial use. Many variations within the spirit of this invention and within the spirit and scope of the claims are possible and will occur to those skilled in this art.

I claim:

1. A system for extracting useful energy from the wind, comprising a windmill; a closed circuit containing a liquid; pump means driven by said windmill to place said liquid under pressure in said circuit; and a flow control impedance to permit a predetermined constant volumetric flow of said liquid in said circuit per unit of time and across which said pressure drops to yield heat.

2. A system according to claim 1 including a heat exchanger to extract the heat developed at said impedance and deliver it for use.

3. A system according to claim 1 in which said pump means comprises an hydraulic cylinder mounted on said windmill; and an eccentric drive from said windmill actuating a piston in said cylinder to drive said liquid around said circuit.

4. A system according to claim 3 including a rectifier through which said liquid is delivered to provide unidirectional flow across said impedance.

5. A system for extracting useful energy from the wind, comprising a windmill; a closed circuit containing a liquid; pump means driven by said windmill to place said liquid under pressure in said circuit; a flow control impedance to permit a predetermined constant volumetric flow of said liquid in said circuit per unit of time; a fluid motor in said circuit; and an electrical generator driven by said motor.

* * * * *